United States Patent [19]
Fischer

[11] Patent Number: 5,373,405
[45] Date of Patent: Dec. 13, 1994

[54] RECORDING AND/OR REPRODUCING APPARATUS CONSTRUCTED TO RECEIVE A MAGNETIC TAPE CASSETTE

[75] Inventor: Karl Fischer, Perchtoldsdorf, Austria

[73] Assignee: U.S. Philips Corporation, New York, N.Y.

[21] Appl. No.: 138,822

[22] Filed: Oct. 15, 1993

[30] Foreign Application Priority Data

Dec. 21, 1992 [AT] Austria ................... 2529/92

[51] Int. Cl.⁵ .......................................... G11B 5/008
[52] U.S. Cl. ...................................... 360/96.5; 360/137
[58] Field of Search ....................... 360/96.5, 96.6, 137

[56] References Cited

U.S. PATENT DOCUMENTS 4,701,817 10/1987 Uemura .................. 360/96.5
4,712,145 12/1987 Naruki et al. ............ 360/96.5

FOREIGN PATENT DOCUMENTS 2204663 5/1974 Germany .

*Primary Examiner*—A. J. Heinz
*Attorney, Agent, or Firm*—Brian J. Wieghaus

[57] ABSTRACT

In a recording and/or reproducing apparatus (1) for a magnetic-tape cassette (6), the apparatus having at least one magnetic head (31, 32), at least one pressure device (46) for urging the cassette (6) towards the magnetic head (31, 32), a control device (52) for starting a "recording" mode, and a locking device (71) for locking the control device (52), the pressure device (46) and the locking device (71) are arranged and constructed to cooperate with one another, and the pressure device (46) holds the locking device (71) disengaged from the control device (52) when no cassette (6) has been inserted into the apparatus (1), and the pressure device (46) releases the locking device (71) to allow cooperation with the control device (52) when a cassette (6) has been inserted into the apparatus (1). (FIG. 3 )

2 Claims, 2 Drawing Sheets

RECORDING AND/OR REPRODUCING APPARATUS CONSTRUCTED TO RECEIVE A MAGNETIC TAPE CASSETTE

The invention relates to a recording and/or reproducing apparatus adapted to receive a cassette accommodating a magnetic tape, which apparatus comprises at least one magnetic head for scanning a magnetic tape accommodated in a cassette inserted into the apparatus, at least one pressure device, which is movable between a rest position and a pressure position, which in its pressure position acts upon a cassette inserted into the apparatus, and which is spring-loaded towards the rest position, for urging the inserted cassette towards the magnetic head, a control device, which is movable between a first switching position and a second switching position and which is spring-loaded towards the first switching position, for starting a mode of operation of the apparatus in the second switching position, and a locking device which is adapted to lock the control device in its second switching position, which is movable between a release position and a locking position, which is spring-loaded towards the locking position, and which is set to the release position when a cassette is removed from the apparatus.

Such an apparatus of the type defined in the opening paragraph has been manufactured by the Applicant and has been marketed under the type designation LFH 0320. This known apparatus is a dictation machine for recording and reproducing dictations, which is in the hand-held in operation and whose control device comprises an actuating member in the form of a slide button and an actuating slide connected to the slide button, which can both be set from the first switching position to the second switching position against the force of a return spring, thereby starting the "reproduction" mode in the first position and the "recording" mode in the second position. To hold the actuating slide and hence the slide button in the second switching position against the return spring force the known apparatus comprises a locking device in the form of a locking lever, which is activated after actuation of the slide button and locks the actuating slide and the slide button in their second switching positions. The locking lever is arranged and constructed for cooperation with a pivotable cassette holder of the apparatus, namely in such a manner that when the cassette holder is opened, to remove a cassette from or insert it into this holder, the cassette holder moves the locking lever in such a manner that the actuating slide is released, as a result of which the actuating slide and the slide button are automatically returned to the first switching position under the influence of the return spring.

In the known apparatus the actuating slide and the slide button connected thereto are locked in the second switching position by means of the locking lever, even if no cassette has been inserted into the apparatus. Therefore, if a user of the known apparatus actuates the slide button to start the "recording" mode and no cassette has been inserted into the apparatus the locking lever nevertheless locks the slide button and the actuating slide in the second switching position, so that the user of the apparatus erroneously assumes that the apparatus has been set to the "recording" mode. Without any further additional provisions the user of the apparatus will then assume that a subsequently spoken dictation is actually recorded although this is in fact not the case as a result of the absence of a cassette. In order to signal this undesired and unfavourable error the known apparatus LFH 0320 has additional provisions, i.e. if the control device is set to and locked in its second switching position in the absence of a cassette in the apparatus a warning signal generator is activated when a further slide button for starting normal forward transport of the magnetic tape is subsequently set to its normal forward position, so that the apparatus produces a warning tone. This involves additional cost and the risk that in the event of failure of the warning-signal generator the error is not signalled and thus remains unnoticed.

It is an object of the invention to preclude the above problems and to achieve in a simple manner that in an apparatus of the type defined in the opening paragraph the control device for starting a mode of operation of the apparatus is locked only if the apparatus actually contains a cassette. To this end the invention is characterized in that the pressure device and the locking device are arranged and constructed to cooperate with one another, and without a cassette inserted the pressure device, which is then in its rest position, holds the locking device in its release position, and with a cassette inserted the pressure device, which is then moved to its pressure position, releases the locking device to allow the movement into its locking position. Thus, it is achieved in a particularly simple manner that the locking device for the control device provides locking only when a cassette has been inserted into the apparatus but is held in its rest position in the absence of a cassette, so that the control device is locked in dependence upon the presence of a cassette in the apparatus. If no cassette has been inserted into the apparatus the control device can be set to its second switching position if no further precautions have been taken, but subsequently the control device is not locked and is immediately returned to its first switching position when the user of the apparatus ceases to set the control device by hand to the second switching position. Thus, in the absence of a cassette the automatic return of the control device to its first switching position always forms an indication for the user of the apparatus that the desired mode of operation is not started although at first the control device has been set to its second switching position. The steps in accordance with the invention further have the advantage that when a cassette is removed from the apparatus, which causes the pressure device to return to its rest position as a result of the absence of a cassette, the pressure device automatically resets the locking device to its release position, so that the locking device releases the control device, which returns to its first switching position, i.e. the return of the control device to its first switching position is advantageously controlled directly by the cassette, so that this is also achieved in an apparatus from which a cassette is removed and into which it is inserted directly by hand without requiring a cassette holder receiving the cassette and controlling the movement of the locking device to its release position, as in the case of the above-mentioned prior-art apparatus. It is also advantageous that the steps in accordance with the invention can be implemented very simply and require hardly any additional cost at all but can be realized by an appropriate arrangement and construction of the pressure device and the locking device, which are present in any case.

It is to be noted that from DE-PS 22 04 663 a magnetic-tape-cassette apparatus having a compartment for holding a cassette and having devices for recording and reproducing signals is known, which apparatus comprises an control device which can be switched between a first switching position, in which a reproduction mode is active, and a second switching position, in which a recording mode is active, a locking device for locking the control device being provided and comprising an arm which is movable between a first position and a second position depending on the removal or insertion of a cassette from/into the compartment of the apparatus and which is thus disengageable from and engageable with the control device, the arm of the locking device having one end projecting into the compartment and being operable by any cassette present in the compartment, to lock the control device in its instantaneous switching position, i.e. either in the first switching position or in the second switching position, when the arm engages with said control device.

Indeed, in the apparatus in accordance with DE-PS 22 04 663 the control device is also automatically reset to its first switching position if no cassette has been inserted into the apparatus and the control device is released upon its actuation, and if a cassette is removed from the apparatus. However, to start the "recording" mode in the apparatus known from DE-PS 22 04 663 the control device must be actuated and subsequently held by the user and it may not be released until the cassette has been inserted into the apparatus. If a cassette is inserted into the known apparatus without prior actuation and holding of the control device, the control device subsequently cannot be moved at all by actuation, i.e. the "recording" mode can no longer be started at all. Thus, an illogical and comparatively intricate operation is required to start the "recording" mode in the known apparatus.

Conversely, a more logical switching process and a simpler operation of the apparatus to set it to the desired mode of operation are achieved with an apparatus in accordance with the invention. This is for example important in pocket dictation machines which are handheld in operation. In an apparatus in accordance with the invention the control device also returns immediately to its first switching position after actuation if no cassette has been inserted into the apparatus or a cassette is removed from the apparatus, as is also the case with the apparatus in accordance with DE-PS 22 04 663. However, a different and, above all, more logical and simpler feature than with the apparatus in accordance with DE-PS 22 04 663 is that in an apparatus in accordance with the invention a cassette can be inserted without a previously actuated control device having to be held, and that subsequently the control device can be actuated which, if this is not inhibited by other means, is then set to its second switching position, in which it is locked by the locking device. This improved operation is achieved in that the locking device is controlled by the pressure device, which is not the case with the apparatus in accordance with DE-PS 22 04 663 because said apparatus does not have such a pressure device.

In an apparatus in accordance with the invention it is found to be particularly advantageous if there is provided a protection device which is movable between a blocking position and a release position, which comprises a blocking element adapted to cooperate with the control device and a sensing element adapted to detect a removable protection element of a cassette, and which by means of its blocking element blocks a movement of the control device from the first switching position to the second switching position when the protection element has been removed from an inserted cassette. By means of this additional precaution it is further achieved that in principle the control device cannot be moved out of its first switching position if a cassette protected by removal of the protection element has been inserted into the apparatus or if no cassette has been inserted.

The invention will be described in more detail hereinafter with reference to the drawings, which show an exemplary embodiment to which the invention is not limited.

Figure 1:
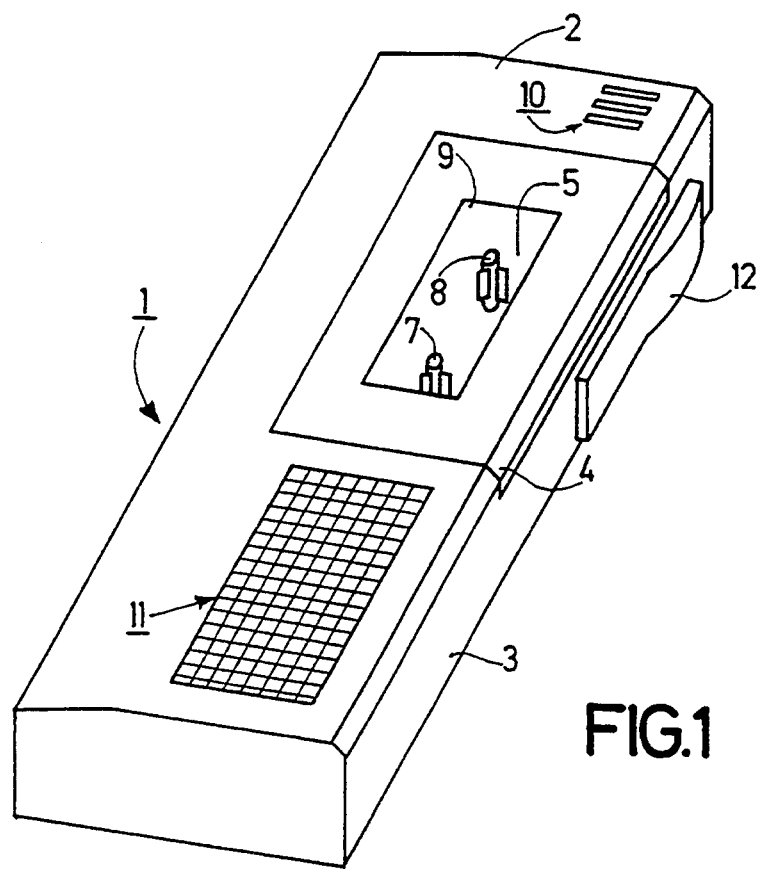
FIG. 1 is a substantially full-scale oblique view of a pocket dictation machine which forms an embodiment of a recording and reproducing apparatus in accordance with the invention and which is adapted to receive a cassette accommodating a record carrier in the form of a tape.
Figure 2:
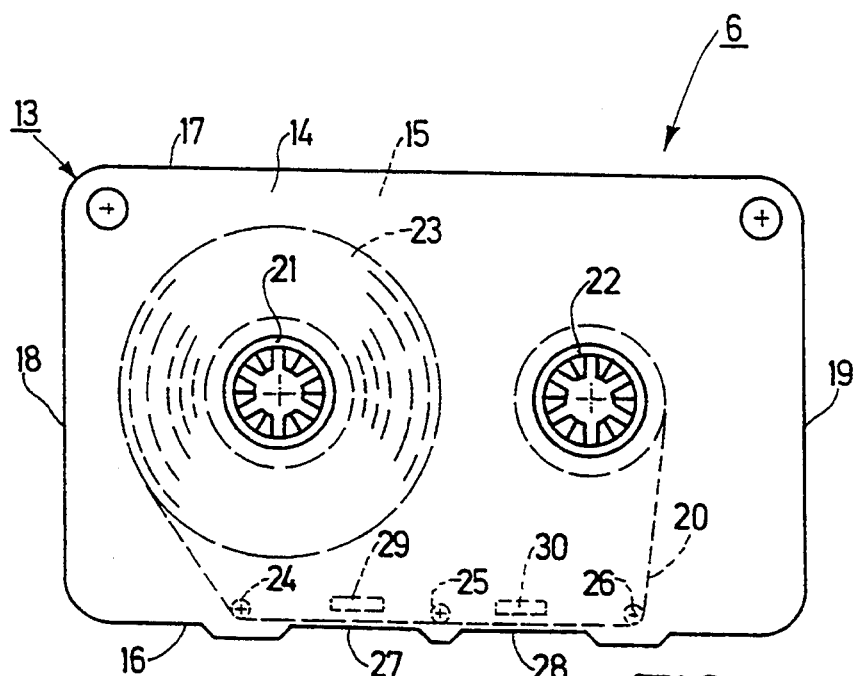
FIG. 2 is a partly diagrammatic plan view to a larger than full-size scale, showing a cassette suitable for insertion into the apparatus shown in FIG. 1.
Figure 3:
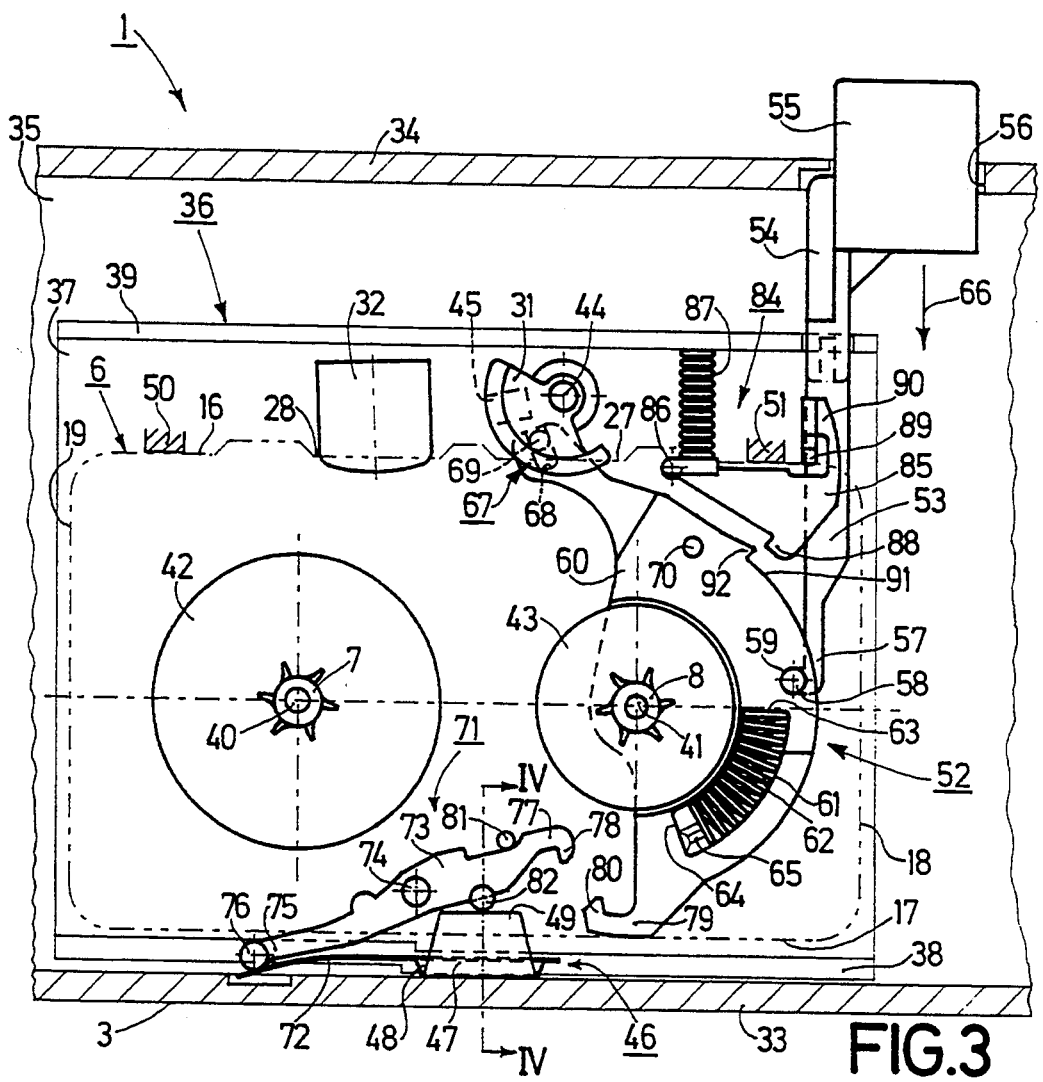

FIG. 3 shows a pan of the apparatus of FIG. 1 in a slightly simplified plan view, taken to a larger scale than FIGS. 1 and 2 and with the upper pan of the apparatus cut away, the shown part of the apparatus comprising a control device for starting a "recording" mode and a locking device for locking the control device, as well as a pressure device for urging a cassette inserted into the apparatus towards a magnetic head of the apparatus.

Figure 4:
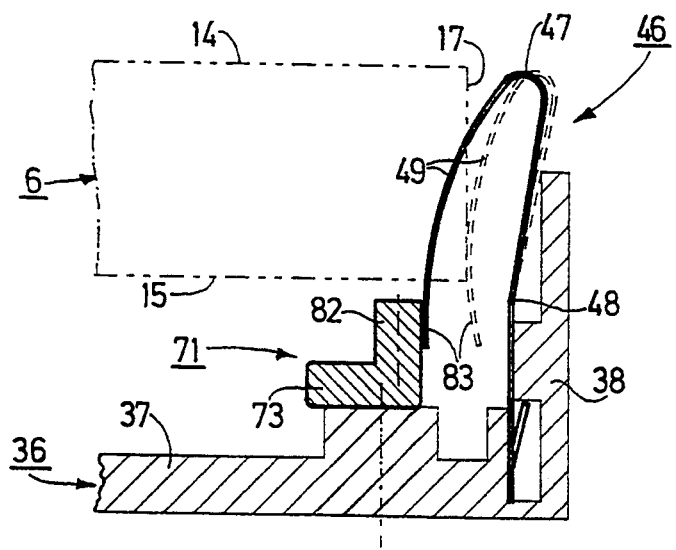

FIG. 4 shows the pressure device and the locking device of the apparatus of FIGS. 1 and 3 in a sectional view taken on the line IV—IV in FIG. 3.

FIG. 1 shows a recording and reproducing apparatus 1 constructed as a pocket dictation machine for recording and reproducing speech signals. The apparatus 1 has a cover 4, which is pivotably mounted at the upper side 2 of the apparatus and extends into a long narrow apparatus side 3 visible in FIG. 1, for closing a cassette compartment 5, into which a cassette 6 as shown in FIG. 2 and accommodating a record carrier in the form of a magnetic tape can be inserted with its longitudinal axis parallel to the longitudinal axis of the apparatus 1. FIG. 1 illustrates a situation in which there is no cassette in the cassette compartment 5. A forward winding mandrel 7 and a reverse winding mandrel 8 project from the lower pan of the apparatus into the cassette compartment 5 and are visible through a transparent window 9 of the cover 4. In its upper side 2 the apparatus has a row 10 of sound transmission slots, behind which a built-in microphone is arranged in the apparatus 1, and a diagrammatically shown pattern 11 of sound transmission apertures behind which a built-in loudspeaker is arranged in the apparatus 1. At its long narrow side 3 visible in FIG. 1 the apparatus 1 has a slide button 12 which is slidable in the longitudinal direction of this narrow side 3 to start tape transport modes of the apparatus 1. The slide button 12 can be moved to and fro by hand between four operating positions, which positions in succession correspond to the tape-transport modes "fast reverse", "stop", "normal forward" and "fast forward".

The cassette 6 has a rectangular housing 13 comprising a first cassette main side 14, visible in FIG. 2, a second cassette main side 15, not visible in FIG. 2, a long narrow front side 16, a long narrow rear side 17, a short narrow left-hand side 18 viewed in FIG. 2, and a short narrow right-hand side 18 viewed in FIG. 2. For the storage of speech signals the cassette 6 accommodates a record carrier in the form of a magnetic tape 20, two juxtaposed rotatably drivable reel hubs 21 and 22 being rotatably mounted between the two cassette main sides 14 and 15 for taking up the magnetic tape 20. At its ends the magnetic tape 20 is attached to the reel hubs 21 and 22 and in the cassette 6 shown in FIG. 2 it has been wound completely onto the reel hub 21 to form a tape spool 23. The magnetic tape 20 extends from the spool 23 on the reel hub 21 to the other reel hub 22 via three cylindrical tape guides 24, 25 and 26. By means of the tape guides 24, 25 and 26 the magnetic tape 20 is guided along the long narrow cassette side 16, in which two openings 27 and 28 are provided. At the location of the two openings 27 and 28 two pressure felts 29 and 30 are arranged so as to be movable in a manner not shown, by means of which the magnetic tape 20 can be pressed against the head faces of two magnetic heads 31 and 32 of the apparatus, which magnetic heads can be brought into scanning contact with the magnetic tape 20 through the two openings 27 and 28. The two magnetic heads 31 and 32, which are shown diagrammatically in FIG. 3, comprise a magnetic erase head 31 for erasing speech signals on the magnetic tape 20 and magnetic recording and reproducing head 32 for recording and reproducing speech signals on/from the magnetic tape 20.

The cassette 6 can be inserted into the apparatus 1 in two mutually inverted positions, the winding mandrels 7 and 8 of the apparatus entering into driving engagement with the reel hubs 21 and 22 through one of the cassette main sides 14 and 15 depending on the position of the cassette 6, so that with a cassette 6 inserted into the apparatus 1 each of the two winding mandrels 7 and 8 is in driving engagement with one of the reel hubs 21 and 22 to drive the magnetic tape 20. In all the tape-transport modes of the present apparatus 1 the magnetic tape 20 is driven in that only one of the two winding mandrels 7 and 8 is driven.

The part of the apparatus 1 in FIG. 1 which is relevant to the invention will be described with reference to FIGS. 3 and 4. A mounting plate 36 is secured in the space between two long side walls 33 and 34, of which the side wall 33 is the wall corresponding to the long narrow side 3 of the apparatus, and a bottom wall 35 of the apparatus housing, which mounting plate comprises a plate portion 37 extending parallel to the bottom wall 35 and two plate portions 38 and 39 extending substantially perpendicularly to this plate portion 37. The mounting plate 36 carries two spindles 40 and 41, locked against rotation. The forward winding mandrel 7 is rotatably mounted on the spindle 40 and the reverse winding mandrel 8 is rotatably mounted on the spindle 41. Each of the two winding mandrels 7 and 8 is locked in rotation to one of two winding mandrel wheels 42 and 43 which are coaxial with the two winding mandrels 7 and 8. The winding mandrel wheel 42 which is locked in rotation to the forward winding mandrel 7 is constructed as a friction wheel. The winding mandrel wheel 43 which is locked in rotation to the reverse winding mandrel 8 is constructed as a toothed wheel.

As already stated, the apparatus 1 comprises two magnetic heads 31 and 32, the magnetic head 31 being an erase head. The magnetic head 31 is constructed as a so-called permanent-magnet erase head. The erase head 31 is pivotable about a spindle 44. The erase head 31 comprises a permanent magnet 45, which can be pivoted anti-clockwise about the spindle 44 from an non-operational position shown in FIG. 3 into an operational position in which the permanent magnet 45 is in contact with the magnetic tape 20 in the cassette 6, so that previously recorded signals on the magnetic tape 20 are erased by the permanent magnet 45 as the magnetic tape 20 is moved. Such an erasure of previously recorded signals is effected in the "recording" mode of the apparatus 1, for which reason the permanent magnet 45 of the erase head 31 is pivoted into its operational position when the apparatus 1 is set to the "recording" mode.

The apparatus 1 further comprises a movable pressure device 46 by means of which a cassette 6, which has been inserted into the apparatus 1 and which for the sake of clarity is shown only in dash-dot lines in FIGS. 3 and 4, can be urged towards the two magnetic heads 31 and 32. The pressure device 46 is movable between a rest position, which it assumes when no cassette 6 has been inserted into the apparatus 1 and which is shown in solid lines in FIG. 4, and a pressure position, in which it acts upon a cassette 6 inserted into the apparatus 1. The pressure device 46 is spring-loaded towards the rest position and in the present case this spring-load is obtained simply in that the complete pressure device 46 is formed by a single spring 47 made of a leaf-spring material. The spring 47 is substantially U-shaped and comprises a first spring arm 48, whose free end engages with the offset plate portion 38 of the mounting plate 36, and a second spring arm 49, which is adapted to cooperate with the long narrow rear side 17 of a cassette 6, as is shown in FIG. 4. When the spring arm 49 engages with the long narrow rear side 17 of a cassette 6 the long narrow front side 16 of this cassette will bear against two positioning stops 50 and 51 provided on the mounting plate 36 and shown only diagrammatically in FIG. 3.

To set the apparatus 1 to the "recording" mode the apparatus 1 comprises a control device 52. The control device 52 comprises an actuating slide 53 having one end 54 connected to a slide button 55 which extends through an opening 56 in the housing wall 34 and which can thus be actuated, for example with the middle finger, while the apparatus 1 is held in the hand in operation. At its end 57 opposite the end 54 the actuating slide 53 carries a pin 58 which projects into a hole 59 formed in a control lever 60 of the control device 52. The control lever 60 is pivotable about the fixed spindle 41. The control lever 60 has an arcuate recess 61 in which a compression spring 62 is arranged, which spring has one end acting against one end 63 of the recess 61 and another end acting against a stop 65, which projects perpendicularly from the plate portion 37 of the mounting plate 36 and which engages the recess 61 at the other end 64 of the recess 61. The compression spring 62 urges the control lever 60 in the anti-clockwise direction viewed in FIG. 3, which in the situation illustrated in FIG. 3 results in the control lever 60 bearing against the stop 65 with the end 64 of its recess 61, thereby defining the position of the control lever 60 and the actuating slide 53 in this situation, said slide being coupled to the control lever 60 via the pin-and-hole joint formed by the pin 58 and the hole 59. This position is the first switching position. The control device 52, which thus basically comprises the actuating slide 53 with the slide button 55 and the control lever 60, is movable between this first switching position, shown in FIG. 3, and a second switching position, which for simplicity is not shown in FIG. 3. In the first switching position of the control device 52 the apparatus 1 is in the "reproducing" mode. In the second switching position of the control device 52 the apparatus 1 is set to the "recording" mode. The control device 52 can be set from the first switching position, shown in FIG. 3, to the second switching position by moving the slide button 55 in the direction indicated by an arrow 66. Such a movement of the slide button 55 in the direction indicated by the arrow 66 also causes the actuating slide 53 to be moved in the direction indicated by the arrow 66, as a result of which the control lever of the control device 52 is pivoted clockwise opposed by the compression spring 62. The erase head 31 is then pivoted anti-clockwise via a pin-and-slot joint 67 formed by a slot 68 in the control lever 60 and a pin 69 projecting from the erase head 31, as a result of which the permanent magnet 45 is pivoted into its operational position. When the control lever 60 is pivoted an actuating pin 70, which projects perpendicularly from the control lever 60, actuates an electrical recording/reproducing switch, not shown, by means of which the apparatus 1 is set from its reproducing mode to its recording mode.

In order to lock the control device 52 in its second switching position the apparatus 1 has a locking device 71. The locking device 71 is movable between a release position shown in FIG. 3 and a locking position, which is not shown in FIG. 3 and in which it locks the control device 52 in its second switching position. The locking device 71 is spring-loaded towards its locking position, which in the present case is achieved in that the spring 47 used to form the pressure device 46 comprises a third spring arm 72, which projects laterally from its first spring arm 48 and which urges the locking device 71 towards its locking position. In the apparatus 1 the locking device 71 comprises a two-arm locking lever 73, which is pivotable about a spindle 74 carried by the mounting plate 36. At one end 75 the locking lever 73 comprises a cylindrical right-angled projection 76 against which the third spring arm 72 of the spring 47 engages. At the other end 77 the locking lever 73 has a hook 78 adapted to cooperate with a counterhook 80 provided at an end 79 of the control lever 60. To define the release position of the locking lever 73 of the locking device 71 there is provided a stop pin 81 which projects from the mounting plate 36 and against which the lever 73 is urged by the third spring arm 72 of the spring 47.

In the apparatus 1 the pressure device 46 and the locking device 71 are arranged and constructed to co-operate with one another. For this purpose the pressure device 46 and the locking device 71 are arranged side by side in the apparatus 1 and the locking lever 73 of the locking device 71 has a coupling pin 82 which projects perpendicularly from the latching lever 73 into the area of the free end 83 of the second spring arm 49 of the spring 47 forming the pressure device 46 and which is acted upon by the second spring arm 49 of the spring 47. The force of the second spring arm 49 is selected to be substantially larger than that of the third spring arm 72, which also acts on the locking lever 73. In the absence of a cassette the pressure device 46, i.e. the spring 47, which is then in its rest position, holds the locking device 71, i.e. in fact the locking lever 73, in its release position, as shown in solid lines in FIG. 3 and in FIG. 4. With a cassette 6 inserted the pressure device 46, i.e. the spring 47, which has then been moved to its pressure position, disengages the locking device 71, i.e. in fact the locking lever 73, to allow its movement into its locking position, as shown in broken lines in FIG. 4. With a cassette 6 in the apparatus 1 the third spring arm 72 of the spring 47 causes the locking lever 73 to be moved so far that the locking lever 73 assumes its locking position, so that by means of its hook 78 the locking lever 73 can lock and thereby retain the counterhook 80 of the control lever 60 and, consequently, the entire control device 52 after the control device 52 has been moved from its first switching position to its second switching position.

The apparatus 1 further comprises a protection device 84 by means of which it is possible to block a movement of the control device 52 from the first switching position into the second switching position. The protection device 84 comprises a protection lever 85 which is supported so as to be pivotable relative to the mounting plate 36 about a spindle 86 and which is loaded by a compression spring 87 which also bears against the plate portion 39 of the mounting plate 36. The protection device 84 is movable between a release position shown in FIG. 3 and a blocking position not shown in FIG. 3. The protection device 84 comprises a blocking element 88 adapted to cooperate with the control device 52, i.e. with the control lever 60 of the control device 52, which blocking element is formed by a nose-shaped projection of the protection lever 85. The protection device 84 further comprises a sensing element 89 which is adapted to detect the presence of a removable protection element of a cassette 6 and which in the present case comprises a sensing pin projecting from a side arm 90 of the protection lever 85. In the situation shown in FIG. 3 the removable protection element of the cassette 6 has not been removed from this cassette 6 and, consequently, it is allowed to record signals on the magnetic tape 20 of the cassette 6. As a result of this, the protection lever 85 is held in its release position against the action of the compression spring 87 via the sensing pin 89. When a cassette 6 is inserted into the apparatus 1, from which cassette the removable protection element has actually been removed to inhibit recording on the magnetic tape 20 of the cassette, the sensing pin 89 is not moved out of and remains in its initial position when this cassette 6 is inserted into the apparatus 1, as a result of which the protection lever 85 is held in its blocking position under the influence of the compression spring 87, in which position the projection 88 abuts against a bounding wall 91 of the control lever 60, the blocking element formed by the projection 88 then being situated in the path of movement of a nose 92 provided on the control lever 60, the projection 88 thereby blocking, via the nose 92, a movement of the control lever 60 and hence of the actuating slide 53 with the slide button 55 from the first switching position to the second switching position.

With the above apparatus it is achieved in a particularly simple manner, through the cooperation between the pressure device and the locking device as described above, that the locking device for the control device is enabled to effect locking only with a cassette inserted in the apparatus but is held in its rest position in the absence of a cassette, so that the control device for starting the "recording" mode is locked in , dependence upon the presence of a cassette in the apparatus. If no cassette or a cassette whose protection element has been removed is inserted into the apparatus this is detected by means of the protection device, which subsequently prevents the control device from being moved to its second switching position to start the "recording" mode. Conversely, when a cassette whose protection element has not been removed ins inserted into the apparatus the locking device for the control device is activated and the control device can be moved to its second switching position, in which it is subsequently held by the previously activated locking device. Upon a subsequent removal of the cassette from the apparatus, which causes the pressure device to return to its rest position because of the absence of the cassette, the pressure device is forced to return the locking device to its release position, so that the locking device enables the control device to start the "recording" mode and the control device consequently returns to its first switching position. Thus, the return of the control device to its first switching position is advantageously controlled directly by the cassette.

The invention is not limited to the embodiment described above because it can also be applied to other embodiments. For example, the control device may have a different construction for starting the "recording" mode, such as a push-button instead of a hand-operated slide button and also a slidably guided control slide instead of a pivotable control lever. Moreover, a pressure device of another construction may be used and may be formed, for example, by means of a spring-loaded lever. Alternative constructions are also conceivable for the locking device. A control device of an apparatus, for starting a mode of operation of the apparatus in the second switching position of the control device, may also be adapted to start a mode other than the "recording" mode, although the steps in accordance with the invention are preferably intended for use in conjunction with the "recording" mode.

I claim:

1. A recording and/or reproducing apparatus (1) adapted to receive a cassette (6) accommodating a magnetic tape (20), which apparatus comprises at least one magnetic head (31, 32) for scanning a magnetic tape (20) accommodated in a cassette (6) inserted into the apparatus (1), at least one pressure device (46), which is movable between a rest position and a pressure position, which in its pressure position acts upon a cassette (6) inserted into the apparatus (i), and which is spring-loaded towards the rest position, for urging the inserted cassette (6) towards the magnetic head (31, 32), a control device (52), which is movable between a first switching position and a second switching position and which is spring-loaded towards the first switching position, for starting a mode of operation of the apparatus (1) in the second switching position, and a locking device (71) which is adapted to lock the control device (52) in its second switching position, which is movable between a release position and a locking position, which is spring-loaded towards the locking position, and which is set to the release position when a cassette (6) is removed from the apparatus (1), characterized in that the pressure device (46) and the locking device (71) are arranged and constructed to cooperate with one another, and without a cassette (6) inserted the pressure device (46), which is then in its rest position, holds the locking device (71) in its release position, and with a cassette (6) inserted the pressure device (46), which is then moved to its pressure position, releases the locking device (71) to allow the movement into its locking position.

2. An apparatus as claimed in claim 1, characterized in that there is provided a protection device (84) which is movable between a blocking position and a release position, which comprises a blocking element (88) adapted to cooperate with the control device (52) and a sensing element (89) adapted to detect a removable protection element of a cassette (6), and which by means of its blocking element (88) blocks a movement of the control device (52) from the first switching position to the second switching position when the protection element has been removed from an inserted cassette (6) (FIG. 3).

* * * * *